(12) United States Patent
Mandramoorthy et al.

(10) Patent No.: US 12,112,177 B2
(45) Date of Patent: Oct. 8, 2024

(54) POLICY DRIVEN ZERO TOUCH PROVISIONING OF NETWORK DEVICES

(71) Applicant: Juniper Networks, Inc., Sunnyvale, CA (US)

(72) Inventors: Prammanayagam Mandramoorthy, Bangalore (IN); Arun Singh Dangi, Bengaluru (IN); Praveen Bk, Bangalore (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 369 days.

(21) Appl. No.: 17/304,239

(22) Filed: Jun. 16, 2021

(65) Prior Publication Data

US 2022/0405106 A1    Dec. 22, 2022

(51) Int. Cl.
*G06F 9/4401* (2018.01)
*G06N 20/00* (2019.01)
(Continued)

(52) U.S. Cl.
CPC ........... *G06F 9/4416* (2013.01); *G06N 20/00* (2019.01); *H04L 61/5014* (2022.05); *H04L 67/34* (2013.01)

(58) Field of Classification Search
CPC ... G06F 9/4416; G06N 20/00; H04L 61/5014; H04L 67/34
See application file for complete search history.

(56) References Cited

U.S. PATENT DOCUMENTS 6,170,008 B1    1/2001  Bahlmann et al.
9,137,111 B2    9/2015  Jubran et al.
(Continued)

FOREIGN PATENT DOCUMENTS

CN    1588949 A    3/2005
CN    1658574 A    8/2005
(Continued)

OTHER PUBLICATIONS

Extended Search Report from counterpart European Application No. 21208320.8 dated Apr. 11, 2022, 7 pp.
(Continued)

*Primary Examiner* — Terrell S Johnson
(74) *Attorney, Agent, or Firm* — Shumaker & Sieffert, P.A.

(57) ABSTRACT

A policy driven zero touch provisioning (ZTP) system implements techniques for policy driven ZTP of network devices. One or more ZTP policies, configurations and/or boot images associated with one or more network devices are stored in a database. Upon execution of a boot sequence, a network device automatically sends a DHCP request including network device identification information to the policy driven ZTP system. The policy driven ZTP system identifies a matching ZTP policy having conditions that match the network device identification information. The ZTP system generates a DHCP response including IP leasing information, a boot configuration information by which a boot configuration may be automatically obtained, and/or boot image information by which a boot image may be automatically obtained as defined by the matching ZTP policy. The techniques allow ZTP policies to be defined with device-level granularity for boot configuration and/or boot images.

20 Claims, 7 Drawing Sheets

(51) Int. Cl.
  *H04L 61/5014* (2022.01)
  *H04L 67/00* (2022.01)

(56) References Cited

U.S. PATENT DOCUMENTS

| | | | |
|---|---|---|---|
| 9,832,082 | B2 | 11/2017 | Dade et al. |
| 10,862,742 | B2 | 12/2020 | Singh |
| 10,938,855 | B1* | 3/2021 | Waldie ................. G06F 21/575 |
| 10,958,537 | B2 | 3/2021 | Safavi |
| 10,958,585 | B2 | 3/2021 | Safavi |
| 10,985,969 | B2 | 4/2021 | Safavi et al. |
| 2010/0180016 | A1 | 7/2010 | Bugwadia et al. |
| 2018/0034698 | A1 | 2/2018 | Perez et al. |
| 2018/0203681 | A1* | 7/2018 | Acharya ............. G06F 9/45558 |
| 2019/0238539 | A1 | 8/2019 | Arora et al. |
| 2019/0319859 | A1* | 10/2019 | Casey ................. H04L 41/5051 |
| 2020/0044917 | A1 | 2/2020 | Peng |
| 2021/0067380 | A1 | 3/2021 | Hegde et al. |
| 2021/0297409 | A1* | 9/2021 | Rahn ................... H04L 63/0823 |
| 2022/0353147 | A1* | 11/2022 | Kurmala ............ H04L 12/4675 |

FOREIGN PATENT DOCUMENTS

| | | | | |
|---|---|---|---|---|
| CN | 102594579 | A | 7/2012 | |
| CN | 103906099 | A | 7/2014 | |
| CN | 104704775 | A | 12/2017 | |
| CN | 108632074 | A | 10/2018 | |
| CN | 3675418 | * | 7/2020 | ............. H04L 12/24 |
| CN | 112491603 | A | 3/2021 | |
| EP | 3675418 | A1 | 7/2020 | |
| WO | 20150196441 | A1 | 12/2015 | |

OTHER PUBLICATIONS

Response to Extended Search Report dated Apr. 11, 2022, from counterpart European Application No. 21208320.8 filed Jun. 16, 2023, 23 pp.
Watsen et al. " Secure Zero Touch Provisioning (SZTP)" draft-ietf-netconf-zerotouch-29, NETCONF Working Group, Internet-Draft, Internet Engineering Task Force (IETF), Jan. 15, 2019, 97 pp.
U.S. Appl. No. 16/835,757, filed Mar. 31, 2020, Juniper Networks, Inc. (inventor: Wang et al) entitled "Network System Fault Resolution Via a Machine Learning Model".
Alexander et al., "DHCP Options and BOOTP Vendor Extensions", Network Working Group, Bucknell University, Geneva, Switzerland, Mar. 1, 1997, 34 pp., URL: https://www.rfc-editor.org/rfc/rfc2132.
Communication pursuant to Article 94(3) EPC from counterpart European Application No. 21208320.8 dated Sep. 27, 2023, 8 pp.
Droms et al., "Dynamic Host Configuration Protocol", Network Working Group, Bucknell University, Geneva, Switzerland, Mar. 1, 1997, 45 pp., URL: https://www.rfc-editor.org/rfc/rfc2131.html.
First Office Action and Search Report, and translation thereof, from counterpart Chinese Application No. 202111353519.4, dated Dec. 12, 2023, 16 pp.
Liu, "Network security management solution based on DHCP Snooping technology", Electronics World, Sep. 19, 2021, 4 pp., Translation provided for only the Abstract.
Response to Extended Search Report dated Sep. 27, 2023, from counterpart European Application No. 21208320.8 filed Jan. 23, 2024, 13 pp.
Wan, "DHCP service solution", Electronic Technology and Software Engineering, vol. 12, Aug. 2016, 3 pp., Translation provided for only the Abstract.
Summons to Attend Oral Proceedings Pursuant to Rule 115(1) EPC from counterpart European Application No. 21208320.8 dated Apr. 3, 2024, 8 pp.
Juniper, "Understanding Zero Touch Provisioning (EZ Touchless Provisioning), implementation and configuration", Juniper Networks, Apr. 24, 2013, 14 pp., URL: https://supportportal.juniper.net/s/article/EX-Understanding-Zero-Touch-Provisioning-EZ-Touchless-Provisioning-implementation-and-configuration?language=en_US.
Notice of Intent to Grant, and translation thereof, from counterpart Chinese Application No. 202111353519.4 dated Jul. 12, 2024, 7 pp.
Wu et al., "Design of Jiangsu Telecom Integrated Network Element Activation System", Telecommunication Science, vol. 8, Aug. 15, 2007, 5 pp., Translation provided for only the Abstract.

* cited by examiner

| MAC | Serial | Source Subnet | Vendor | Model | Action | SubnetInfo | Image | Config |
|---|---|---|---|---|---|---|---|---|
| HE:xxxxx | Any | 10.20.10.1/24 | VendorA | ABCxxx | Allow | 10.20.10.1/24 GW:10.20.10.1 | Recommended | Copy-pasted cli |
| Any | EFEFADDF | Any | VendorB | XYZxxx | Allow | 10.20.10.1 GW:10.20.10.1 | User selected | Selected templates |
| FEExxxxx | Any | Any | Any | Any | Deny | - | - | - |
| ... | ... | ... | ... | ... | ... | ... | ... | ... |

FIG. 2

POLICY DRIVEN ZERO TOUCH PROVISIONING OF NETWORK DEVICES

TECHNICAL FIELD

This disclosure generally relates to network devices and, more particularly, to deployment and activation of network devices.

BACKGROUND

Large enterprises often face the challenge of mass distribution and deployment of network infrastructure. For example, an enterprise may operate a number of geographically distributed facilities (e.g., offices, retail outlets, and the like) that require network connectivity to a central or main office of the enterprise and optionally to each other. In such cases, a challenge arises when the enterprise desires to install or upgrade network devices at each of the many remote facilities. For example, a central information technology (IT) administrative group of the enterprise may coordinate an effort to upgrade computers, firewalls, gateways, routers, Virtual Private Network (VPN) appliances, switches or other network equipment in each of the remote facilities. Such operations may require deployment and activation of hundreds or sometimes thousands of devices. Manual configuration of each individual device at the final location and/or staging of such devices at a centralized location before shipping to the final location, is laborious, prone to errors, costly and time-consuming.

To simplify the process, Zero Touch Provisioning (ZTP) allows enterprises to provision new devices in a network automatically, with minimal manual intervention. New or replacement devices can be sent to a site, physically installed and powered up by any local employee, without the need for specialized IT personnel. ZTP can dramatically reduce lead time, time spent on installation and the number of configuration errors when provisioning new devices in a network.

SUMMARY

In general, the disclosure describes techniques for policy driven Zero Touch Provisioning (ZTP) of network devices. To reduce the technical complexity of configuring a network device to an unsophisticated user, conventional devices may use ZTP to remotely and automatically perform a first-time configuration of a network device for use within an enterprise network. Additional information with respect to the ZTP protocol is described in "Zero Touch Provisioning for Networking Devices," Internet-Draft, Internet Engineering Task Force (IETF), available at https://tools.ietf.org/html/draft-ietf-netconf-zerotouch, the entire contents of which is incorporated herein by reference.

However, with conventional ZTP techniques, in order to locate the necessary software image and configuration files on the network, the information must be statically configured upfront on a Dynamic Host Configuration Protocol (DHCP) server. If the DHCP server is not configured to provide this information, the device boots with preinstalled software and default factory configuration. These configurations are defined on a global or subnet level, as it would be practically impossible to statically configure devices on an individual basis. In addition, conventional ZTP techniques do not track progress of DHCP or download/installation time of device configuration and/or software images. As a result, troubleshooting and debugging of network configurations and/or software images is difficult.

In accordance with one or more techniques of the disclosure, the disclosure describes techniques for policy driven Zero Touch Provisioning (ZTP) of network devices. A policy driven ZTP system includes a ZTP controller, a smart DHCP server and a smart Hypertext Transfer Protocol (HTTP) server. A network administrator manages one or more ZTP policies, which are stored in a database. The database also stores one or more boot configurations and/or boot software images associated with one or more devices or types of network devices.

Each ZTP policy defines one or more condition(s) defining, for example, one or more of a specific device, a group of devices, or type of device to which the ZTP policy applies. The condition(s) may include, for example, one or more of a Media Access Control (MAC) address of a specific device or group of devices, a serial number of a specific device, a source subnet, a vendor identifier, a model identifier, etc. Each ZTP policy further defines one or more of an action, subnet/gateway information, boot configuration information and/or boot image information associated with network devices matching the ZTP policy conditions.

When a new network device boots up, the device sends a request to the smart DHCP server. The request may include, for example, a DHCP request. The DHCP request includes device identification information such as, for example, one or more of the device's MAC address, serial number, source subnet, vendor identifier, model identifier, etc. The smart DHCP server transmits the DHCP request to the ZTP system controller for policy enforcement. A policy enforcer application running on the ZTP system controller compares the device identification information received in the DHCP request with the condition(s) included in the one or more ZTP policies stored in the database to identify a matching ZTP policy. Based on the matching ZTP policy, the smart DHCP server generates and sends a response back to the device. The response may include, for example, a DHCP response. The DHCP response includes IP leasing information (e.g., an IP address assigned to the device and a default gateway address). The DHCP response further includes one or more of the action, subnet/gateway information, or boot information as defined by the matching ZTP policy. The boot information may include, for example, one or more Uniform Resource Locator(s) (URLs) by which the network device can automatically obtain a boot configuration or a boot image defined for the device based on the matching ZTP policy. The one or more URL(s) include(s) a device identification token that identifies the network device that generated the DHCP request.

The boot information received in the DHCP response configures the network device to automatically query the smart HTTP server to obtain one or more of a boot configuration or a boot image based on the device identification token contained in the DHCP response. The smart HTTP server/ZTP controller generates the corresponding boot configuration and/or retrieves the corresponding boot image based on the device identification token specified in the query and transfers them to the device. The boot configuration may be retrieved from a database or automatically generated based on the device identification token and the matching ZTP policy. The device then configures itself according to the received boot configuration and/or boot image and begins normal network operation.

The techniques of the disclosure provide one or more technical advantages. For example, the techniques of the disclosure provide specific technical improvements to the computer-related field of network device deployment and configuration. The techniques of the disclosure enable touchless provisioning to remotely and automatically configure network devices. The policy driven ZTP provisioning techniques can be defined on an individual device basis, by device group, by subnet, by vendor, by model, etc., thus providing for flexible and dynamic fine-grained control of the provisioning of network devices. ZTP policies can be defined with device-level granularity for boot configuration and/or boot images. Multiple boot configurations and/or boot images may be dynamically provisioned, rather than only providing a limited number of static and rudimentary boot configurations and/or boot images as is the case with conventional provisioning techniques.

The techniques further provide for fine grained, device-level progress tracking of ZTP progress metrics (e.g., policy enforcement time, configuration pull time, image pull time, number or retry attempts, etc.). These metrics may be presented for display on a user computing device and/or be input into a machine learning model to learn network patterns, identify problematic boot configuration files and/or boot images, etc. Additionally, the techniques of the disclosure may reduce the cost and technical burden on the end user of deploying and configuring network devices to operate within an enterprise network.

In one example, this disclosure describes a system, comprising a plurality of network devices; a memory storing one or more zero touch provisioning (ZTP) policies; and a policy driven ZTP system comprising one or more processors configured to: receive a request from a first network device of the plurality of network devices, the request including network device identification information that identifies the first network device; identify, based on the identification information contained in the request, a matching ZTP policy from among the one or more ZTP policies; and generate a response to the first network device, the response including address information assigned to the first network device and boot information corresponding to the first network device as defined by the matching ZTP policy.

In another example, the disclosure describes a method comprising receiving, by one or more processors of a policy driven zero touch provisioning (ZTP) system, a request from a first network device of a plurality of network devices, the request including network device identification information that identifies the first network device; identifying, by the one or more processors, a matching ZTP policy from among a plurality of ZTP policies based the identification information contained in the request; and generating, by the one or more processors, a response to the first network device, the response including address information assigned to the first network device and boot information corresponding to the first network device as defined by the matching ZTP policy.

In another example, the disclosure describes a network device comprising a memory; and one or more processors configured to: generate a request to a policy driven zero touch provisioning (ZTP) system, the request including network device identification information that identifies the network device from among a plurality of network devices; receive a response from the ZTP system, the response including address information assigned to the network device and boot information for the network device, the response generated by the ZTP system based on a matching ZTP policy identified by the ZTP system based on the network device identification information included in the request; automatically generate, based on the boot information included in the response, at least one of a configuration pull request to the ZTP system and an image pull request to the ZTP system; and automatically perform a bootstrapping operation of the network device based on at least one of a boot configuration received in response to the configuration pull request and a boot image received in response to the image pull request.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 2 is a table showing example ZTP policies in accordance with the techniques of the disclosure.

DETAILED DESCRIPTION

Figure 1:
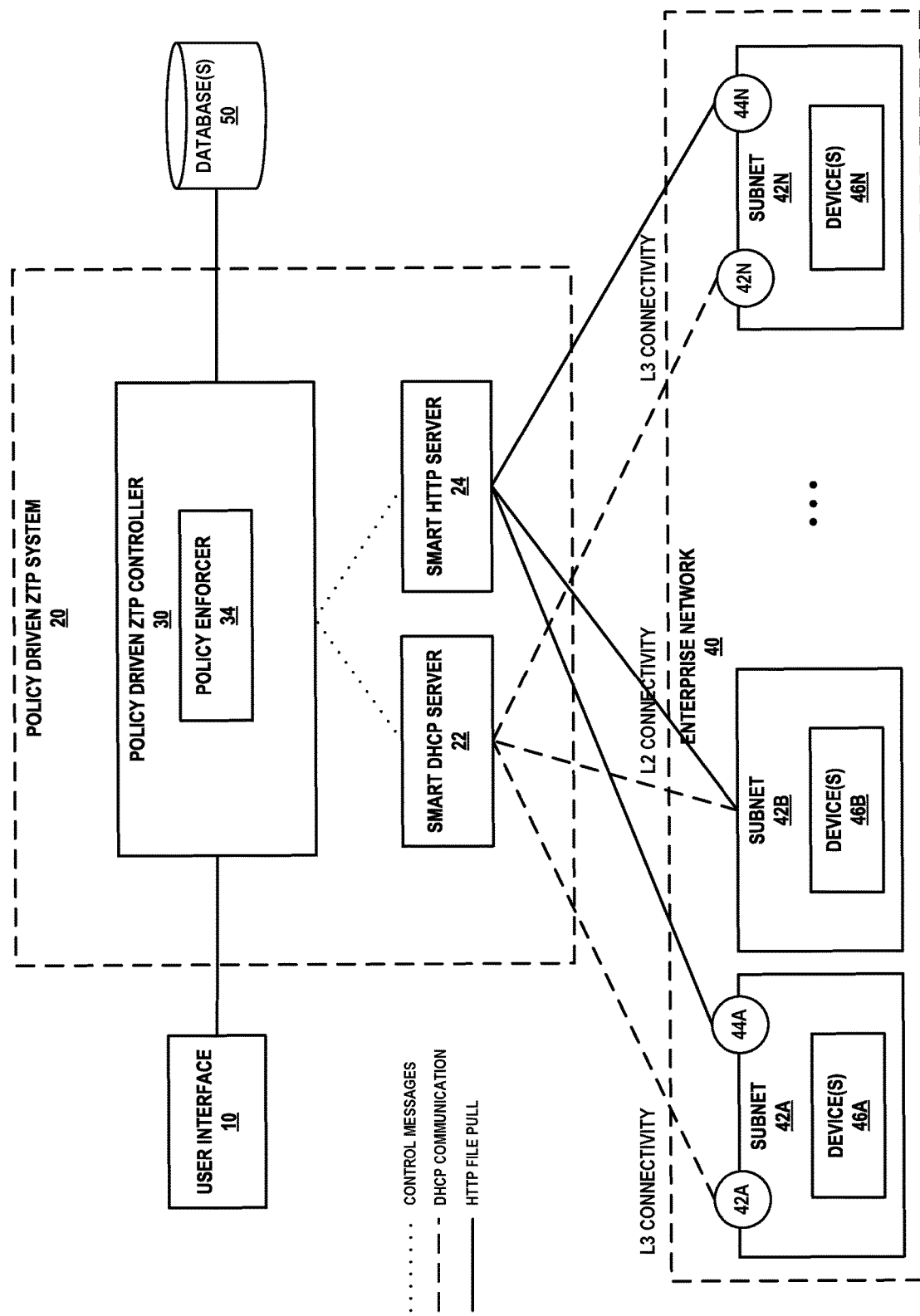
FIG. 1 is a block diagram of an example network environment including policy driven zero touch provisioning (ZTP) of network devices in accordance with the techniques of the disclosure.

FIG. 1 is a block diagram illustrating an example network environment including policy driven zero touch provisioning (ZTP) of network devices in accordance with the techniques of the disclosure. A policy driven ZTP system 20 includes a policy driven ZTP controller 30, a smart DHCP server 22, and a smart HTTP server 24. An enterprise network 40 includes one or more subnets 42A-42N. Subnet 42A includes one or more network device(s) 46A, subnet 42B includes one or more network device(s) 46B, and subnet 42N includes one or more network device(s) 46N. Network device(s) 46A-46N (referred to generally as device 46 or device(s) 46) may include any physical device configured to support communication between computing devices on one or more computer networks. For example, network device(s) 46A-46N may include any one or more of a hub, a router, a switch, a gateway, a VPN appliance, a modem, an access point, a repeater, and the like.

FIG. 1 is a block diagram illustrating an example network environment including policy driven zero touch provisioning (ZTP) of network devices in accordance with the techniques of the disclosure. In some examples, policy driven ZTP system 20 is a remote or cloud-based system that provides policy driven ZTP provisioning services to one or more enterprise networks, such as enterprise network 40. In some examples, some or all of the components of policy driven ZTP system 20 may be local or specific to a particular enterprise network. In some examples, policy driven ZTP system 20 is part of an Element Management System. An element management system (EMS) in a Network Functions Virtualization (NFV) implementation, for example, provides network management of the virtualized network functions (VNFs) and physical network elements (PNEs). A VNF Manager notifies the EMS that it needs to provide element management for a new VNF or PNE.

In the example of FIG. 1, subnet 40A and subnet 40N exist on different subnets than smart DHCP server 22 and smart HTTP server 24, and thus include DHCP relays 42A and 42N and gateways 44A and 44N, respectively, for layer 3 (L3) connectivity. Subnet 40B exists on the same subnet as smart DHCP server 22 and smart HTTP server 24 (layer 2 (L2) connectivity), and thus does not require a DHCP relay or default gateway in order to communicate with smart DHCP server 22 and smart HTTP server 24.

Policy driven ZTP system 20 includes a ZTP controller 30, a smart Dynamic Host Configuration Protocol (DHCP) server 22 and a smart Hypertext Transfer Protocol (HTTP) server 24. Policy driven ZTP system 20 provides for zero touch provisioning of network devices, such as any one or more of network devices 46A-46N on subnets 40A-40N, respectively, in accordance with the techniques of the disclosure.

A database 50 stores one or more ZTP policies. The ZTP policies are managed by a network administrator via user interface 10. Database 50 also stores one or more boot configurations and/or boot images associated with one or more devices or types of network devices, which are also managed by a network administrator.

Each ZTP policy includes one or more condition(s) defining, for example, one or more of a specific device, a group of devices, or type of device to which the ZTP policy applies. The condition(s) may include, for example, one or more of a MAC address of a specific device or group of devices, a serial number of a specific device, a source subnet, a vendor identifier, a model identifier, etc. Each ZTP policy further defines one or more of an action, subnet/gateway information, or boot information associated with network devices matching the ZTP policy conditions.

In accordance with one or more techniques of the disclosure, when a new network device 46 initially boots up, network device 46 executes hardcoded instructions for a so-called boot cycle, which is a process during which a processor of a device, such as one of network devices 46, "bootstraps" loading of boot configuration parameters and/or a boot image (e.g., an operating system kernel). For example, during execution of the boot cycle, device 46 sends a request (referred to herein generally as a DHCP request) to smart DHCP server 22. The DHCP request includes, for example, device identification information, such as one or more of the device's MAC address, serial number, source subnet, vendor identifier, model identifier, etc. The DHCP request may include, for example, a DHCP request to request IPS leasing information, such as an IP address and a default gateway address.

In accordance with one or more techniques of the disclosure, a policy enforcer application 34 running on ZTP system controller 30 compares the device identification information received in the request with the condition(s) included in the one or more ZTP policies stored in database 50 to identify a ZTP policy having conditions that match the device identification information. Based on the matching ZTP policy, smart DHCP server 22 generates a response (referred to herein generally as a DHCP response) and sends the response back to device 46. The DHCP response may include, for example, an IP address assigned to device 46 and a default gateway address for the associated subnet as defined by the matching ZTP policy. The DHCP response includes one or more of the action, subnet/gateway information, or boot information as defined by the matching ZTP policy.

The boot information received in the DHCP response configures network device 46 to automatically query smart HTTP server 24 to obtain one or more of a boot configuration or a boot image. Smart HTTP server 24/ZTP controller 30 automatically generates and/or retrieves the corresponding boot configuration and/or boot image and transfers them to device 46. Device 46 then configures itself according to the received boot configuration and/or boot image (e.g., performs a bootstrapping operation) and begins normal network operation.

In one example operation, ZTP controller 30 may compare the device identification information, such as the MAC address, serial number, source subnet, vendor, model, etc., included in a DHCP request received from device 46 with the condition(s) of one or more of the ZTP policies stored in database 50 to identify a ZTP policy having condition(s) that match the device identification information included in the DHCP request. In accordance with the matching ZTP policy, smart DHCP server 22/ZTP controller 30 determines IP leasing information for the device (e.g., an IP address to be assigned to the device from a pool of IP addresses and for the address of the associated gateway 42 (if any)). Smart DHCP server 22 generates a DHCP response including the IP leasing information for the device.

In accordance with the matching ZTP policy, the DHCP response further includes one or both of a first Uniform Resource Locator (URL) by which the device may automatically query smart HTTP server 24 to obtain a boot configuration corresponding to the network device and/or a second URL by which the device may automatically query smart HTTP server 24 to obtain a boot image corresponding to the network device.

The first URL includes a device identification token corresponding to the network device (or identifies a vendor or model, etc., of the network device) that generated the DHCP request. For example, the first URL may be expressed in the following format:

<ZTPSystemIP>:/configuration/SERIALNO.

In this example, the first URL specifies a ZTP system IP address ("ZTP System IP"), the action to be taken ("configuration"), and the device identification token ("SERIALNO") corresponding to the network device which was received in the DHCP request. In other examples, the device identification token may include a MAC address, a source subnet, a vendor, or a model corresponding to the network device identified in the DHCP request according to the matching ZTP policy.

In response to receipt of the DHCP response, network device 46 automatically sends a configuration pull request to the smart HTTP server using the first URL specified in the DHCP response. Smart HTTP server 24 requests ZTP controller 30 to generate a configuration for the network device based on the device identification token included in the first URL specified in the configuration pull request. In response to receipt of the generated configuration, smart HTTP server 24 transfers the generated configuration to the device. In example above, based on the serial number of the network device specified in the device identification token portion of the first URL, if the Configuration field of the matching ZTP policy specifies one or more selected configuration templates, the ZTP controller automatically generates a boot configuration based on the one or more selected configuration templates and smart HTTP server 24 transfers the automatically generated boot configuration to the network device.

The DHCP response may further include a second URL by which the network device may automatically query smart HTTP server 24 to obtain a boot image. The second URL includes a device identification token corresponding not the network device that generated the DHCP request. For example, the second URL may be expressed in the following format:

<ZTPSystemIP>:/image/SERIALNO.

In this example, the second URL specifies the ZTP system IP address ("ZTP System IP"), the action to be taken ("image"), and the device identification token ("SERIALNO") corresponding to the network device which was received in the DHCP request. In other examples, as described above, the device identification token may include a MAC address, a source subnet, a vendor, or a model corresponding to the network device identified in the DHCP request according to the matching ZTP policy.

In response to receipt of the DHCP response, network device 46 automatically sends an image pull request to the smart HTTP server using the second URL specified in the DHCP response. Smart HTTP server 24 requests ZTP controller 30 to retrieve a boot image based on the device identification token included in the second URL specified in the image pull request. In response to receipt of the boot image from ZTP controller 30, smart HTTP server 24 transfers the boot image to the device. In the second URL example given above, based on the serial number of the network device, if the Image field of the matching ZTP policy is "Latest," ZTP controller 30 will retrieve the most recent (e.g., the latest) boot image.

Upon receipt of the boot configuration and/or boot image from smart HTTP server 26, the network device 46 automatically performs a bootstrapping operation and begins normal operation.

In some examples, ZTP controller 30 further automatically tracks the progress of the DHCP and HTTP services, learns to identify DHCP and/or HTTP service failures, identifies possible root causes for the failures, and identifies and/or invokes one or more remedial actions.

FIG. 2 shows an example ZTP policy data structure 52 in accordance with one or more techniques of the disclosure. ZTP policies 52 are managed by a network administrator through, for example, user interface 10 as shown in FIG. 1, and stored in a ZTP policy repository, such as database 50. Each row of ZTP policy data structure 52 includes a ZTP policy, such as ZTP policies 82, 84 and 86, which are shown for example purposes only, and the disclosure is not limited in this respect. The ZTP policies, e.g., 82, 84 and 86, include a priority order such that ZTP controller 30 checks the ZTP policies for matching criteria one by one in priority order from a highest priority ZTP policy to a lowest priority ZTP policy. For example, if example ZTP policy 82 has a highest priority, example ZTP policy 84 has a medium priority and example ZTP policy 86 has a lowest priority, ZTP controller 30 will check ZTP policies 82, 84, 86 in that order until a matching ZTP policy is identified each time a DHCP request is received.

Each column of ZTP policy data structure 52 stores a condition defining, for example, one or more network device (s) to which to which the ZTP policy applies. The condition (s) may include, for example, one or more of a MAC address of a specific device or group of devices (e.g., column 1), a serial number of a specific device (e.g., column 2), a source subnet (e.g., column 3), a vendor identifier (e.g., column 4), a model identifier (e.g., column 5), and/or any other conditions by which a device or group of devices may be identified. In the example ZTP data structure 52 of FIG. 2, ZTP policy 82 applies to all devices having a MAC address HE:xxxxx, any serial number, source subnet 10.20.10.1/24, vendor identifier Vendor A, and model identifier ABCxxx. Example ZTP policy 84 applies to all devices having any MAC address, serial number EFEFADDF, any source subnet, vendor identifier Vendor B, and model identifier XYZxxx. Example ZTP policy 86 applies to all devices having MAC address FEExxxxx, any serial number, any source subnet, any vendor identification, and any model identification.

Example ZTP policies 84 and 86 specify subnet as "Any." ZTP policies 84 and 86 apply to devices from any subnet irrespective of whether the network device has L2 or L3 connectivity with policy driven ZTP system 20, such as any one or more of 46A, 46B or 46N. Example ZTP policy 82 applies to devices having L3 connectivity with policy driven ZTP system, such as device 46A or 46N, only if the subnet matches. Accordingly, ZTP policy 82 includes the source subnet in column 3 as devices 46A and 46N do not exist on the same subnet as smart DHCP server 22 and smart HTTP server 24. In this way, one or more ZTP policies including source subnet/gateway information may be enforced by the policy driven ZTP system in order to automatically configure a network device based on the source subnet included in the device's DHCP request. Through the matching ZTP policy, therefore, network devices may be automatically configured based at least in part on which source subnet they are requesting to join.

Similarly, one or more ZTP policies may be enforced by the policy driven ZTP system in order to automatically configure a network device based on any one or more of the device identification information included in the device's DHCP request, such as MAC address, serial number, source subnet, vendor and/or model identification included in the DHCP request. In this way, the techniques of the disclosure enable fine-grained policies to be defined by the network administrator automatic, policy driven ZTP provisioning of network devices on a per-device basis. The policy driven ZTP provisioning techniques can be controlled on an individual device basis if desired (e.g., by defining a full MAC address and/or serial number to which a ZTP policy applies), by groups of devices (e.g., by defining a partial MAC address and/or partial serial number), by subnet, by vendor, by model, etc., thus providing for flexible and dynamic fine-grained control of the provisioning of network devices. In addition, because the configuration pull request and/or image pull request include network device identity information in the form of a device identification token, the smart HTTP server can uniquely identify the device, restrict unauthorized access, and respond to a DHCP request either from static file stored in a database or dynamically generate a configuration file as directed by the ZTP controller.

Each ZTP policy further includes one or more columns defining one or more of an action, IP leasing information (e.g., IP address and/or subnet/gateway information), or boot information associated with network devices matching the ZTP policy conditions. The action may include, for example, either "Allow" or "Deny" as shown in column 6 of ZTP data structure 52. If the action included in a ZTP policy is "Allow," the ZTP policy instructs smart DHCP server 22 that network device(s) satisfying the ZTP policy conditions have permission to join the requested subnet. If the action specified in a ZTP policy is "Deny," the ZTP policy instructs smart DHCP server 22 that network device(s) satisfying the conditions of the ZTP policy conditions do not have permission to join the requested subnet. For example, the action defined by ZTP policy 86 is "Deny", and therefore ZTP policy 86 instructs DHCP server 22 that any device having the MAC address "FEExxxx" is not permitted to join any source subnet. For this reason, ZTP policy 86 does not specify a source subnet, boot image or boot configuration. As another example, ZTP policies 82 and 84 include the action, "Allowed." ZTP policy 82 specifies subnet information 10.20.10.1/24 and default gateway GW 10:20.10.1. ZTP policy 84 specifies subnet information 10.20.10.1 and default gateway GW 10:20.10.1.

Each ZTP policy may further specify a boot image (e.g., column 8 in the example of FIG. 2) and/or a boot configuration (e.g., column 9 in the example of FIG. 2). The boot image options may include one or more options for each device vendor or model number specified in the ZTP policy, and may include, for example, a "latest" or most recent boot image, a "recommended" boot image, a "latest in major version" boot image, or a "user selected" boot image. In or a "user selected" boot image. In this way, a network administrator may manage which boot image (e.g., latest, recommended or user selected) should be transferred to the device, and can update or change this information at any time.

For example, ZTP policy 82 specifies that a device matching the ZTP policy conditions shown in columns 1-5 should configure itself using a "recommended" boot image for that device. Upon receipt of a DHCP request from a device matching those conditions, smart DHCP server 22 generates a DHCP response including a URL at which the device may obtain the "recommended" boot image by a query to smart HTTP server 24.

As another example, ZTP policy 84 specifies that a device matching the ZTP policy conditions shown in columns 1-5 should configure itself using a "user selected" boot image for that device. Upon receipt of a DHCP request from a device matching those conditions, smart DHCP server 22 generates a DHCP response including a URL at which the device may obtain the "user selected" boot image by a query to smart HTTP server 24.

The boot configuration options may include one or more options for each device vendor or model number specified in the ZTP policy, and may include, for example, an "enable Network Configuration Protocol (NETCONF)" configuration, an "enable outbound Secure Shell (SSH) Protocol" configuration, an "enable Telnet protocol" configuration, a selected one of a plurality of command line interface (CLI) configurations, or one or more of a plurality of template configurations. In this way, a network administrator may manage which configuration should be transferred to the device, and can update or change this information at any time.

For example, ZTP policy 84 specifies that a device matching the ZTP policy conditions shown in columns 1-5 should automatically configure itself based on a copy/pasted CLI boot configuration specified by the ZTP policy. Upon receipt of a DHCP request from a device matching the ZTP policy conditions, smart DHCP server 22 generates a DHCP response including a URL at which the device may obtain the specified copy/pasted CLI boot configuration by a query to smart HTTP server 24.

As another example, ZTP policy 86 specifies that a device matching the ZTP policy conditions shown in columns 1-5 should automatically configure itself based on a selected template boot configuration specified in the ZTP policy. Upon receipt of a DHCP request from a device matching the ZTP policy conditions, smart DHCP server 22 generates a DHCP response including a URL at which the device may obtain the specified selected template boot configuration by a query to smart HTTP server 24.

Figure 3A:
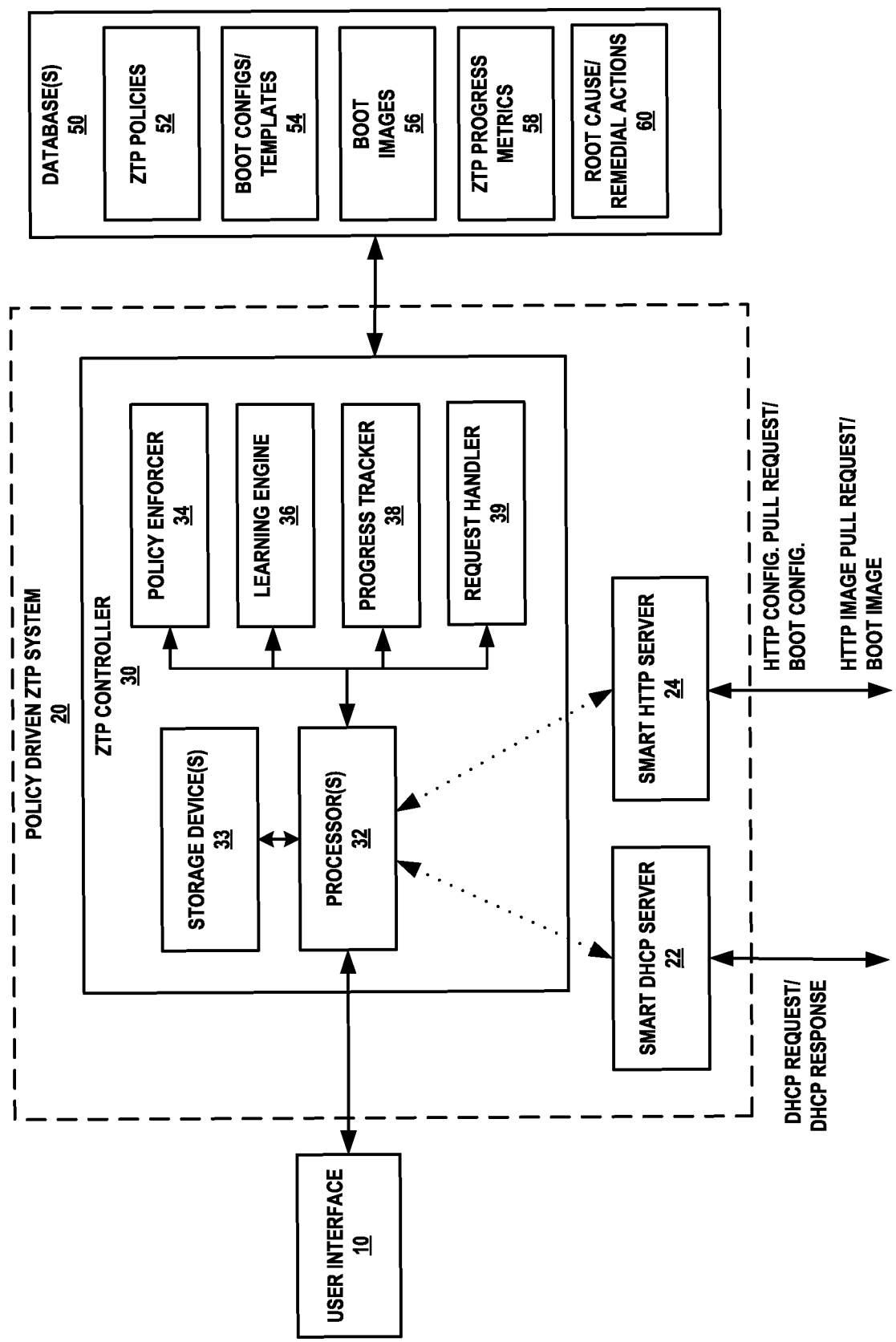
FIG. 3A is a block diagram of an example policy driven ZTP system and example ZTP policy database(s) in accordance with the techniques of the disclosure.

FIG. 3A is a block diagram of an example policy driven ZTP system 20 and example ZTP policy database(s) 50 in accordance with the techniques of the disclosure. As described above with respect to FIG. 1, ZTP system 20 includes a ZTP controller 30, smart DHCP server 22, and smart HTTP server 24. ZTP controller 20 further includes one or more processor(s) 32 and one or more storage device(s) or memories 33. ZTP controller 30 further includes one or more programmed application modules, such as a policy enforcer 34, a learning engine 36, a progress tracker 38 and/or a request handler 39, each of which includes instructions that configure processor(s) 32 to execute one or more policy-driven ZTP techniques of the disclosure.

Database(s) 50 include one or more databases or other data repositories that store a plurality of ZTP policies 52, a plurality of boot configurations/templates 54, and a plurality of boot images 56. Each of the ZTP policies 52 applies to one or more network devices having device information matching the conditions specified by the ZTP policy. Each ZTP policy further defines one or more of IP leasing information, a boot configuration and/or a boot image for the one or more devices having device information (e.g., MAC address, serial number, source subnet, vendor and/or model identification, etc.) that match the ZTP policy conditions. ZTP policies 52, boot configurations/templates 54 and boot images 56 are managed by a network administrator via, for example, user interface 10.

Request handler 39 includes instructions that configure processor(s) 32 to handle DHCP requests to smart DHCP server 22 and queries to HTTP server 24 and construct an appropriate DHCP response. For example, upon receipt of a DHCP request from a network device, request handler handles DHCP requests from smart DHCP server 22 and invokes policy enforcer 34 to identify a ZTP policy 52 that matches the device identification information contained in the incoming DHCP request and obtain the associated action, boot configuration and/or boot image defined by the matching ZTP policy 52 from database 50.

Policy enforcer 34 includes instructions that configure processors 32 of ZTP controller 30 to compare conditions specified in a DHCP request received from DHCP server 22 from a network device (such as one of network devices 46 in FIG. 1) to the conditions of one or more ZTP policies stored in database(s) 50 to identify a ZTP policy having conditions that are matched by the device information from the incoming DHCP request.

For example, smart DHCP server 22 is configured to, in response to receipt of a DHCP request from a network device, forward the device identification information contained in the DHCP request to ZTP controller 30. ZTP controller 30, through execution of policy enforcer 34, compares the device information contained in the DHCP request to one or more conditions of the plurality of ZTP policies stored in database(s) 50 to identify a matching ZTP policy. ZTP controller 30 further, through execution of policy enforcer 34 and based on the matching ZTP policy, instructs smart DHCP server to generate a DHCP response including IP leasing information for the device, a first URL by which the device may obtain the boot configuration, and/or a second URL by which the device may obtain the boot image defined in the matching ZTP policy. The first URL and the second URL may each include a device identification token that identifies the network device that generated the DHCP request. Smart DHCP server 22 transmits the DHCP response including the IP leasing information, the first URL and/or the second URL to the device.

In response to receipt of the DHCP response, device 46 automatically sends a configuration pull request to smart HTTP server 24 using the first URL specified in the DHCP response. Smart HTTP server 24 is configured to request ZTP controller 30 to automatically generate the boot configuration based on the device identification token included in the first URL specified in the configuration pull request and smart HTTP server 24 transfers the generated configuration to the device. Further, in response to receipt of the DHCP response, device 46 automatically sends an image pull request to smart HTTP server 350 using the second URL specified in the DHCP response. Smart HTTP server 24 is configured to request ZTP controller 30 to retrieve the boot image based on the device identification token included in the second URL specified in the image pull request and smart HTTP server 24 transfers the retrieved boot image to the device.

In some examples, ZTP controller 30 includes a progress tracker module 38 that automatically tracks the progress of the policy driven smart DHCP and/or policy driven smart HTTP services provided by policy driven ZTP system 20. For example, depending upon the boot configuration and/or image file sizes, the amount of available memory in the network device 46, the network speed, and other operational parameters of the ZTP system 20, the time required to retrieve the DHCP response information, the boot configuration and/or the boot image may be highly variable. Progress tracker 38 configures processor(s) 32 to collect ZTP progress data associated with execution of the policy driven ZTP services provided by ZTP system 20.

In addition, ZTP controller 30 may further execute learning engine 36 to dynamically construct and apply a machine learning-based ("ML-based") model to collected ZTP progress metrics to determine whether the ZTP progress data represents normal operation of policy driven ZTP system 20 or represents anomalous operation of ZTP system 20. ZTP progress metrics may include, for example, DHCP progress metrics (e.g., policy enforcement time, IP leasing time, IP consumption rate, etc.), configuration pull metrics (e.g., configuration pull time, configuration download time, configuration file size, etc.), image pull metrics (e.g., image pull time, image download time, image file size, image upgrade time, etc.). By applying ML-based techniques to one or more ZTP progress metrics collected over time, learning engine 36 may learn expected ranges for one or more of the ZTP progress metrics and learn to identify when any of the ZTP progress metrics are outside of expected ranges. Learning engine 36 may further learn when such anomalies in the ZTP progress metrics represent anomalous operation of policy driven ZTP system 20.

ZTP controller 30 may further execute learning engine 36 to determine a root cause of the anomalous ZTP progress data that needs to be addressed in order to facilitate resolution of underlying faults in the network system. ZTP control 30 may further execute learning engine 35 to automatically determine one or more remedial action(s) intended to address the root cause of the anomalous ZTP progress data, generate a notification including an indication of the one or more remedial actions for receipt by a network administrator, or automatically invoke the one or more remedial actions to automatically address the root cause of the anomalous ZTP progress data. The remedial actions may include, for example, restarting or re-configuring the network device, identifying a flawed boot configuration or flawed boot image, identifying a flawed ZTP policy, fix or delete a configuration template for a given ZTP policy, avoid using a particular boot image for one or more particular device models, an indication that a particular boot image causes the network device to take more time to boot after ZTP, etc. The remedial action may also include, based on an "IP consumption rate metric," generating a notification to an administrator suggesting adding additional subnets and/or expanding existing subnets.

Figure 3B:
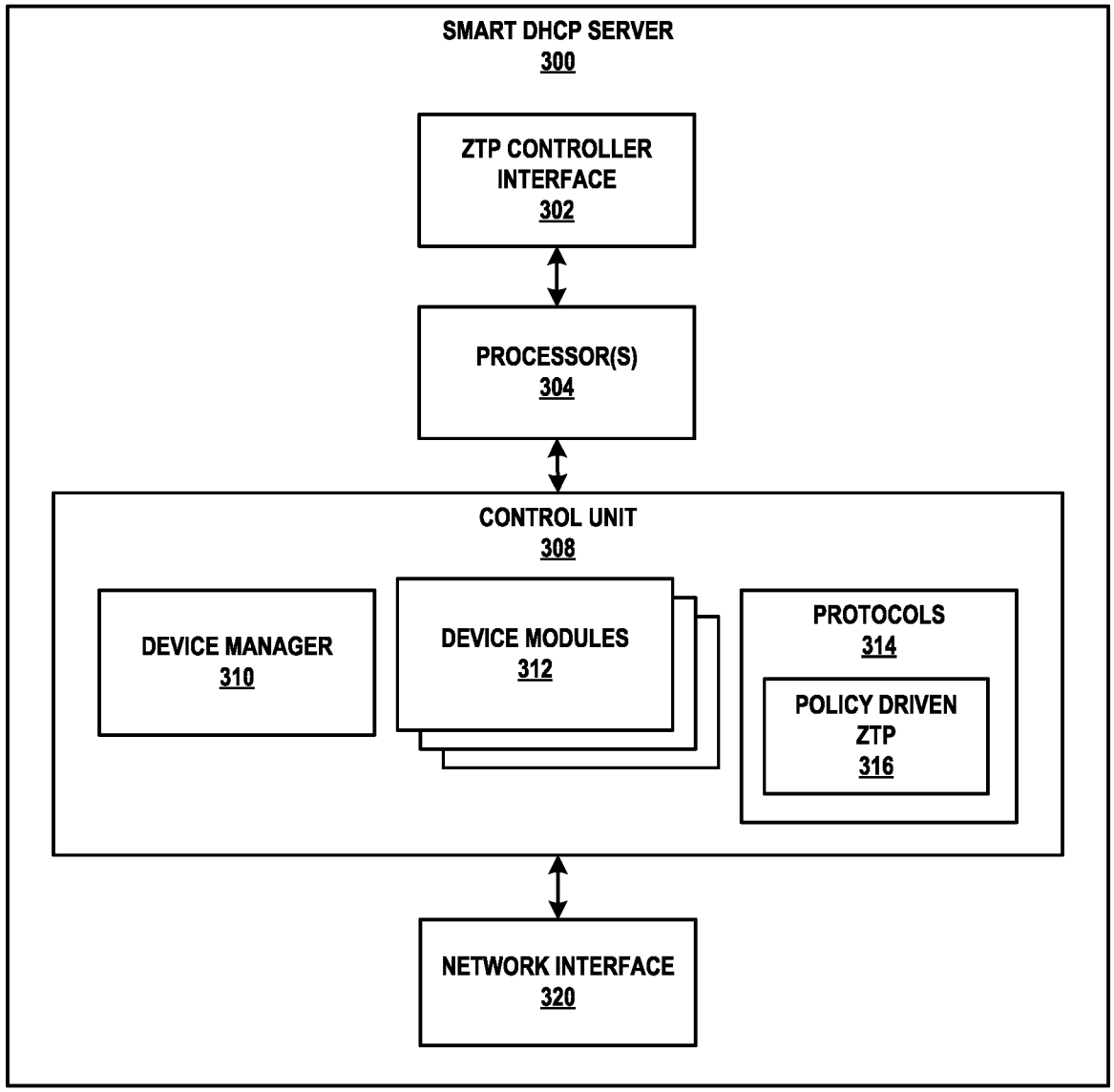
FIG. 3B is a block diagram of an example smart DHCP server in accordance with the techniques of the disclosure.

FIG. 3B is a block diagram illustrating an example smart DHCP server 300 in accordance with the techniques of the disclosure. In some examples, smart DHCP server 300 is an example of smart DHCP server 22 of FIG. 1. Smart DHCP server 300 includes one or more processor(s) 304, a ZTP controller interface 302, a control unit 308 and network interface(s) 320.

ZTP controller interface 302 is configured to send/receive data and/or control messages to/from ZTP controller, such as ZTP controller 30 as shown in FIG. 3A. Processors 304 may include any one or more of a microprocessor, a controller, a digital signal processor (DSP), an application specific integrated circuit (ASIC), a field-programmable gate array (FPGA), or equivalent discrete or integrated logic circuitry.

Control unit 308 includes device modules 312 and protocols 314, which may comprise software modules executed by control unit 308 or discrete, independent hardware units of control unit 308. When any or all of device modules 312 and protocols 314 comprise software, instructions executable by a processor for device modules 312 and protocols 314 may be encoded in a computer-readable medium of smart DHCP server 300, such as storage device(s) 306.

Network interface 320 may comprise any interface for connecting to devices of a computer network, such as ZTP controller 30 and/or network devices 46 as shown in FIG. 1. For example, network interface 320 may comprise an Ethernet interface, a gigabit Ethernet interface, a telephone modem, a cable modem, a satellite modem, or other network interface. In some examples, network interface 320 comprises one or more network interface cards.

Protocols 314 comprise one or more communication protocols for communicating with ZTP system 20 and/or any one of network devices 46. In accordance with one or more techniques of the disclosure, protocols 314 may comprise a policy driven ZTP protocol 316. Protocols 214 may also include one or more routing protocols, security protocols, or other protocols used by DHCP server 300 to communicate with ZTP system 20 and/or devices 46, such as such as Security Shell Protocol (SSH), Point-to-Point Protocol (PPP), Point-to-Point Protocol over Ethernet (PPPoE), Point-to-Point Protocol over ATM (PPPoA), Multi-Protocol Label Switching (MPLS), Border Gateway Protocol (BGP), Simple Network Management Protocol (SNMP), Network Configuration Protocol (NETCONF), etc.

Policy driven ZTP protocol 316 configures processors 304 of smart DHCP server 22 to, in response to receipt of a DHCP request from a network device via network interface (s) 320, transmit a control message to the ZTP controller 30 to request that ZTP controller 30 enforce any policies associated with the device identification information contained in the DHCP request. ZTP controller 30, through execution of policy enforcer 34, compares the device information contained in the DHCP request to one or more conditions of the plurality of ZTP policies stored in database (s) 50 to identify a matching ZTP policy. ZTP controller 30 further, through execution of policy enforcer 34 and based on the matching ZTP policy, transmits a control message to smart DHCP server 20. The control message transmitted by ZTP controller 30 includes the IP leasing information, a first URL at which the device may automatically obtain a boot configuration specified in the matching ZTP policy and/or a second URL at which the device may automatically obtain a boot image specified in the matching ZTP policy. Smart DHCP server 300 transmits the DHCP response including the IP leasing information, the first URL and/or the second URL to the device via network interface(s) 320.

Figure 3C:
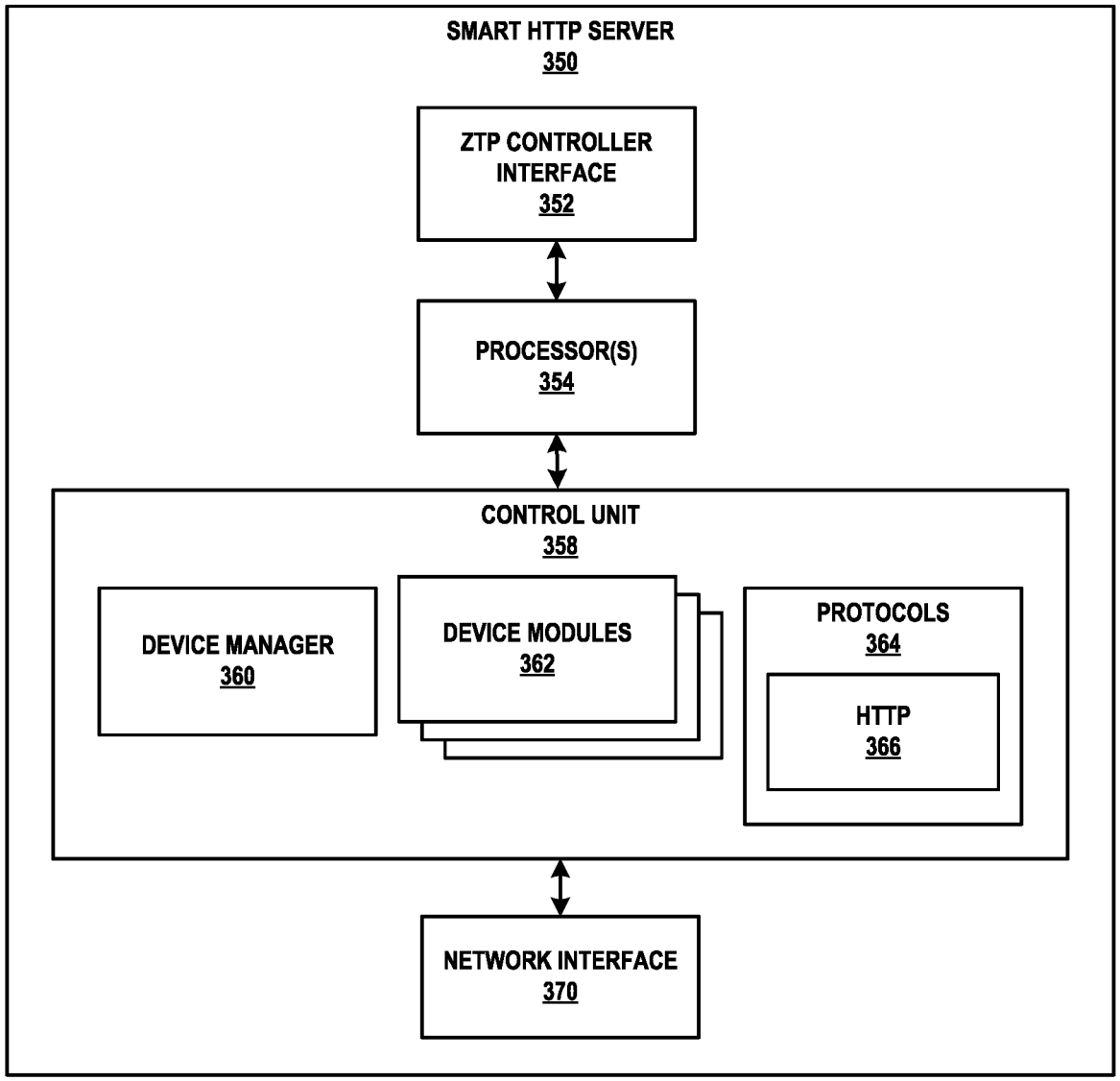
FIG. 3C is a block diagram of an example smart HTTP server in accordance with the techniques of the disclosure.

FIG. 3C is a block diagram illustrating an example smart HTTP server 350 in accordance with the techniques of the disclosure. In some examples, smart HTTP server 350 is an example of smart HTTP server 24 of FIG. 1. Smart HTTP server 350 includes one or more processor(s) 354, a ZTP controller interface 352, a control unit 358 and network interface(s) 370.

ZTP controller interface 352 is configured to send/receive data and/or control messages to/from a ZTP controller, such as ZTP controller 30 as shown in FIG. 3A. Processors 354 may include any one or more of a microprocessor, a controller, a digital signal processor (DSP), an application specific integrated circuit (ASIC), a field-programmable gate array (FPGA), or equivalent discrete or integrated logic circuitry.

Control unit 358 includes device modules 362 and protocols 364, which may comprise software modules executed by control unit 358 or discrete, independent hardware units of control unit 358. When any or all of device modules 362 and protocols 364 comprise software, instructions executable by a processor for device modules 362 and protocols 364 may be encoded in a computer-readable medium of smart HTTP server 350.

Network interface 370 may comprise any interface for connecting to devices of a computer network, such as ZTP controller 30 and/or network devices 46 as shown in FIG. 1. For example, network interface 370 may comprise an Ethernet interface, a gigabit Ethernet interface, a telephone modem, a cable modem, a satellite modem, or other network interface. In some examples, network interface 370 comprises one or more network interface cards.

Protocols 364 comprise one or more communication protocols for communicating with ZTP system 20 and/or any one of network devices 46. For example, protocols 314 may comprise a HTTP protocol 366 by which smart HTTP server 350 may receive configuration pull requests and/or image pull requests from one or more network devices 46. Protocols 214 may also include one or more routing protocols, security protocols, or other protocols used by smart HTTP server 350 to communicate with ZTP system 20 and/or devices 46, such as such as Security Shell Protocol (SSH), Point-to-Point Protocol (PPP), Point-to-Point Protocol over Ethernet (PPPoE), Point-to-Point Protocol over ATM (PPPoA), Multi-Protocol Label Switching (MPLS), Border Gateway Protocol (BGP), Simple Network Management Protocol (SNMP), Network Configuration Protocol (NETCONF), etc.

In response to receipt of a DHCP response, a device 46 automatically sends a configuration pull request to smart HTTP server 350 using the first URL specified in the DHCP response. Smart HTTP server 24 is configured to request ZTP controller 30 to automatically generate a boot configuration based on the device identification token included in the first URL specified in the configuration pull request. In response to receipt of the boot configuration from ZTP controller 30, HTTP server 24 transfers the boot configuration to the device. Further, in response to receipt of the DHCP response, device 46 automatically sends an image pull request to smart HTTP server 350 using the second URL specified in the DHCP response. Smart HTTP server 24 is configured to request ZTP controller 30 to retrieve a boot image based on the device identification token included in the second URL specified in the image pull request. In response to receipt of the boot image from ZTP controller 30, smart HTTP server 24 transfers the received boot image to the network device. Based on the received boot configuration and/or boot image, the network device automatically performs a bootstrapping operation and begins normal operation.

Figure 4:
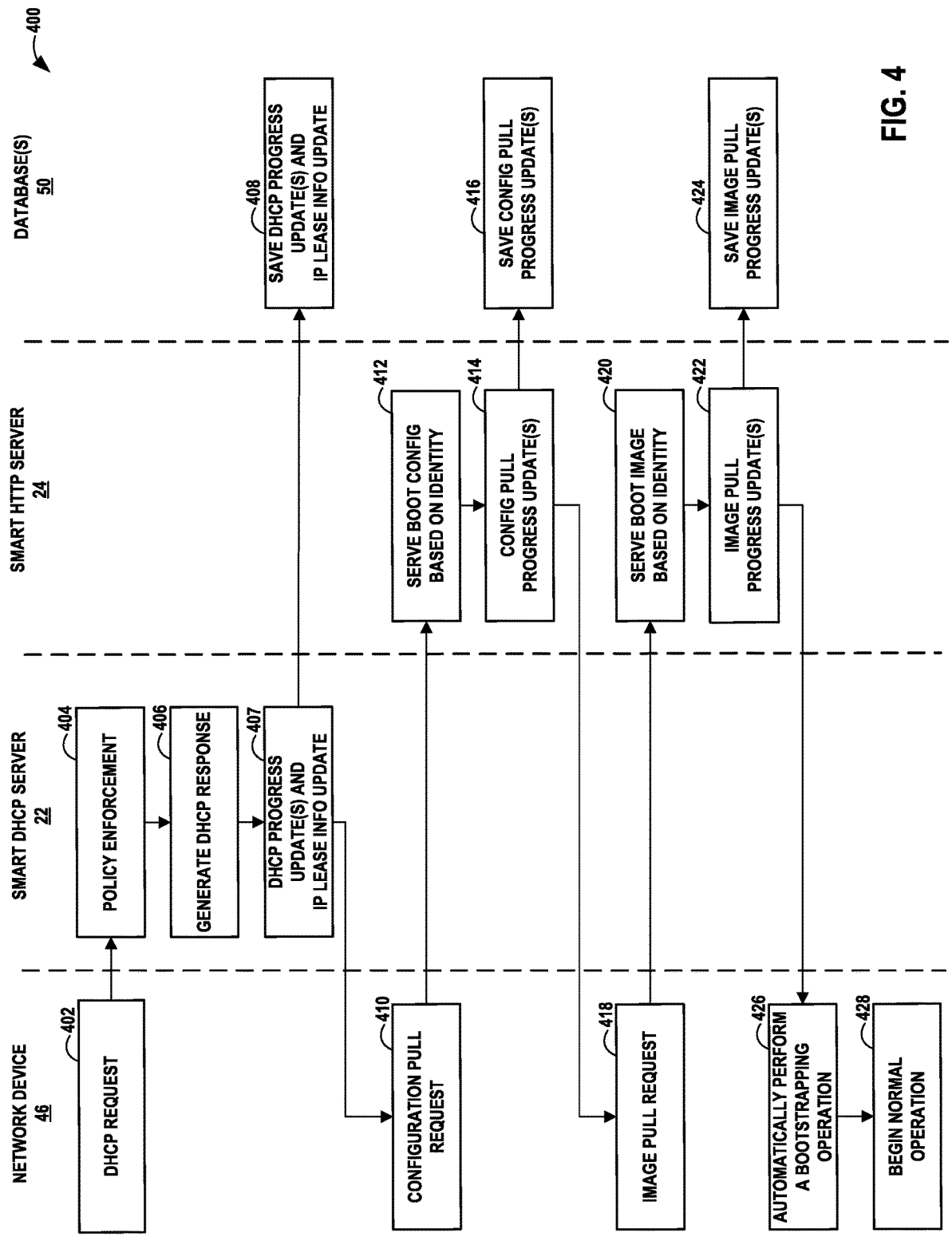
FIG. 4 is a flowchart illustrating an example process of policy driven ZTP provisioning of network devices in accordance with the techniques of the disclosure.

FIG. 4 is a flowchart illustrating an example process (400) for policy driven ZTP provisioning of network devices in accordance with the techniques of the disclosure.

In accordance with one or more techniques of the disclosure, when a new network device 46 initially boots up, device 46 sends a DHCP request to smart DHCP server 22 (402). The DHCP request includes, for example, device identification information, such as one or more of the device's MAC address, serial number, source subnet, vendor identifier, model identifier, etc. The purpose of the DHCP request (402) is to request IP leasing information (e.g., IP address and/or default gateway address) as well as a boot configuration and/or boot image defined by a ZTP policy that matches the device identification information included in the DHCP request.

The DHCP request is received by the smart DHCP server 22. In accordance with one or more techniques of the disclosure, DHCP server 22 communicates with a policy enforcer application 34 running on ZTP system controller 30 to compare the device identification information received in the DHCP request with the condition(s) included in the one or more ZTP policies stored in database 50 to identify a ZTP policy having conditions that match the device identification information (404). Based on the matching ZTP policy, smart DHCP server 22 generates a DHCP response and sends the DHCP response back to device 46 (406). The DHCP response includes IP leasing information, such as an IP address assigned to device 46 and a default gateway address for the associated subnet as defined by the matching ZTP policy.

The DHCP response further includes one or more of an action, subnet/gateway information, boot configuration information and/or boot image information as defined in the matching ZTP policy. The boot configuration information may include, for example, a first URL by which device 46 may automatically query smart HTTP server 24 to obtain a corresponding boot configuration. The boot configuration information may further include, for example, a second URL by which device 46 may automatically query smart HTTP server 24 to obtain a corresponding boot image. The first URL and the second URL may include a device identification token that identifies the network device 46 that generated the DHCP request.

Smart DCHP server 22/policy driven ZTP controller 30 may further monitor one or more DHCP progress metrics during policy enforcement and generation of the DHCP response (407). The DHCP progress metrics may include, for example, policy enforcement time, IP leasing time, IP consumption rate (e.g., number of IPs leased over a predetermined period of time, such as week, month, etc.) and other relevant DCHP progress metrics. The DHCP progress metrics are reported to and saved in database(s) (408), and may be used to troubleshoot and/or diagnose anomalous operation of the policy driven ZTP services provided by ZTP system 20.

In response to receipt of the DHCP response, network device automatically generates at least one of a configuration pull request (410) and/or an image pull request (418). The configuration pull request is an automatically generated query to smart HTTP server 24 as determined by the boot configuration information included in the DHCP response. The boot configuration information may include for example, a first URL including a device identification token that identifies the network device that generated the DHCP request. In response to the configuration pull request and based on the device identification token, HTTP server 24 requests ZTP controller 30 to automatically generate a boot configuration for the network device and/or retrieve the appropriate boot configuration for the network device (412). In response to receipt of the boot configuration, smart HTTP server 24 transfers the generated configuration to the device (412).

Smart HTTP server 24/policy driven ZTP controller 30 may further monitor one or more HTTP progress metrics during retrieval and transfer of the boot configuration (414). The HTTP progress metrics may include, for example, a configuration pull time, a configuration file size, a configuration download time, etc. The HTTP progress metrics are reported to and saved in database(s) (416), and may be used to troubleshoot and/or diagnose anomalous operation of the policy driven ZTP services provided by ZTP system 20.

In response to receipt of the DHCP response, network device may further automatically generate an image pull request (418). The image pull request is an automatically generated query to smart HTTP server 24 as determined by the boot image information included in the DHCP response. The boot image information may include for example, a second URL including a device identification token that identifies the network device that generated the DHCP request. In response to the image pull request, smart HTTP server 24 requests ZTP controller 30 to automatically retrieve a boot image for the network device based on the device identification token included in the second URL specified in the image pull request (420). Smart HTTP transfers the boot image to the device (420). Network device 46 automatically performs a bootstrapping operation based on at least one of a boot configuration received in response to the configuration pull request and the boot image received in response to the image pull request (426), and begins normal operation (428).

Smart HTTP server 24/policy driven ZTP controller 30 may further monitor one or more image pull progress metrics during retrieval and transfer of the boot image (422). The image pull progress metrics may include, for example, an image pull time, an image file size, and upgrade time for the image, an image download time, etc. The image pull progress metrics are reported to and saved in database(s) (416), and may be used to troubleshoot and/or diagnose anomalous operation of the policy driven ZTP services provided by ZTP system 20.

The monitored ZTP progress metrics (e.g., DHCP progress metrics (408), configuration pull progress metrics (416), and image pull progress metrics (424) may be input to one or more ML-based models to determine whether the policy driven ZTP progress data represents normal or anomalous operation of the policy driven ZTP system 20.

Figure 5A:
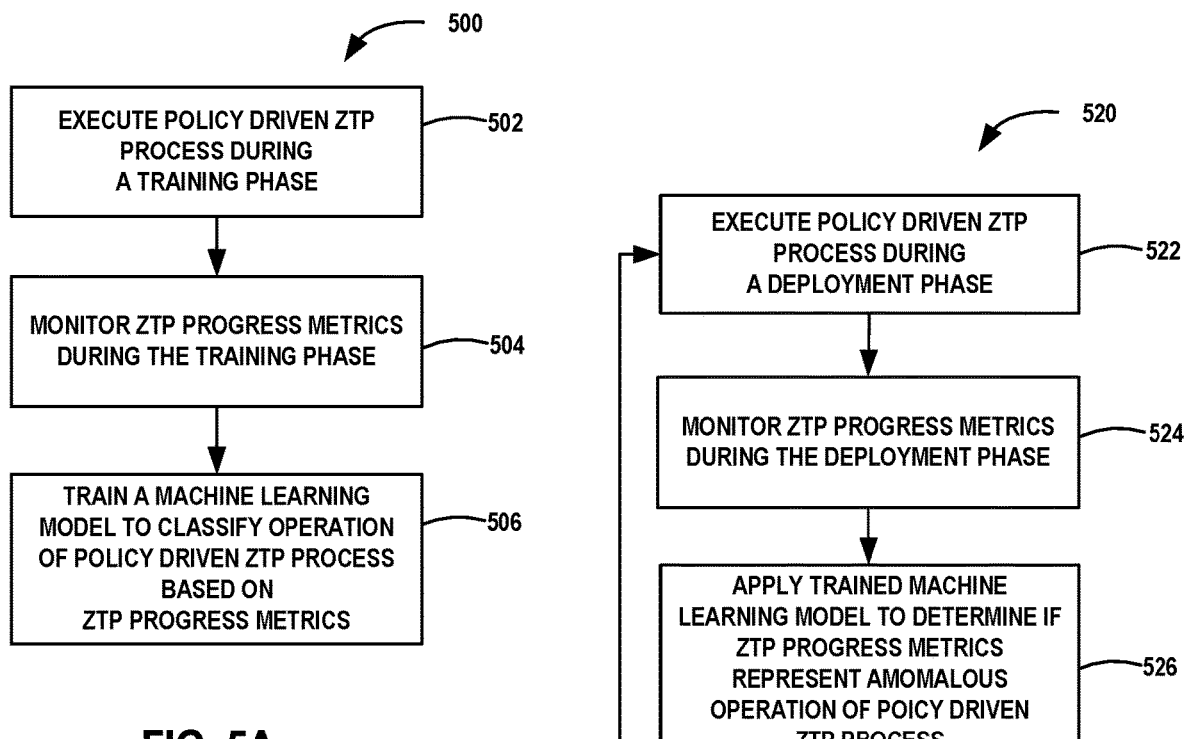
FIG. 5A is a flowchart illustrating an example process by which a controller trains a machine learning model to classify operation of a policy driven ZTP process based on ZTP progress metrics in accordance with the techniques of the disclosure.

FIG. 5A is a flowchart illustrating an example process (500) by which one or more processor(s) train a machine learning model to classify operation of a policy driven ZTP system based on ZTP progress metrics in accordance with the techniques of the disclosure. The one or more processors may include, for example, processor(s) 32 of policy driven ZTP system 20, processor(s) 304 of smart DHCP server 300, and/or processor(s) 354 of smart HTTP server 350. During a training phase, one or more processor(s) of a policy driven ZTP system, such as policy driven ZTP system 20, execute a policy driven ZTP process, such as process (400) as shown in FIG. 5 (502). The processor(s) monitor one or more ZTP progress metrics during the training phase (504). For example, the processor(s) may monitor any one or more of DHCP progress metrics, configuration pull progress parameters, and/or image pull progress parameters during execution of the policy driven ZTP process during the training phase.

The processor(s) train a machine learning model to classify operation of the policy driven ZTP system based on the ZTP progress metrics monitored during the training phase (506). The classifications may include, normal/expected, or anomalous. In some examples, there may be more than one anomalous operation classification. Each classification of anomalous operation may further be associated with a different root cause or reason underlying the anomalous operation.

Figure 5B:
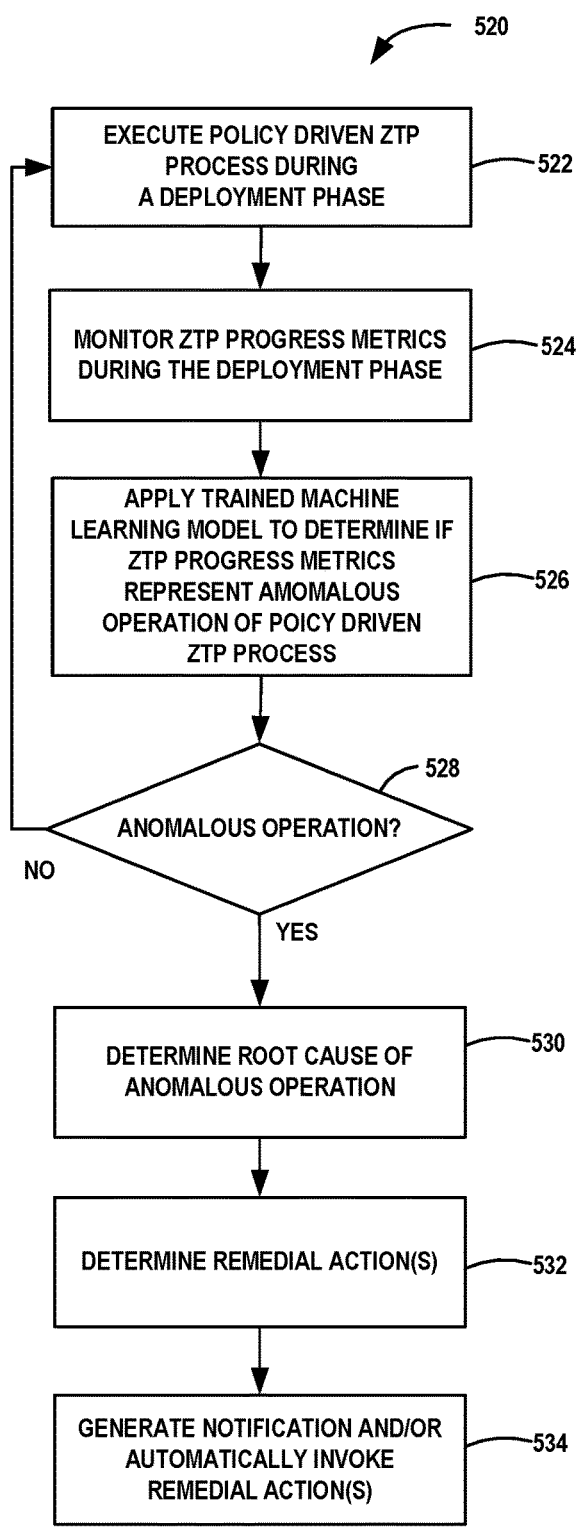
FIG. 5B is a flowchart illustrating an example process by which a controller applies one or more machine learning-based models to determine whether policy driven ZTP progress data represents anomalous operation of a policy driven ZTP system in accordance with the techniques of the disclosure.

FIG. 5B is a flowchart illustrating an example process (520) by which one or more processor(s) applies one or more machine learning-based models to determine whether policy driven ZTP progress data represents anomalous operation of a policy driven ZTP system in accordance with the techniques of the disclosure. The one or more processors may include, for example, processor(s) 32 of policy driven ZTP system 20, processor(s) 304 of smart DHCP server 300, and/or processor(s) 354 of smart HTTP server 350. During a deployment phase, one or more processor(s) of a policy driven ZTP system, such as policy driven ZTP system 20, execute a policy driven ZTP process, such as process (400) as shown in FIG. 5 (522). The processor(s) monitor one or more ZTP progress metrics during the deployment phase (524). The ZTP progress metrics may include, for example, DHCP progress metrics (e.g., policy enforcement time, IP leasing time, IP consumption rate, etc.), configuration pull metrics (e.g., configuration pull time, configuration file size, configuration download time, etc.), image pull metrics (e.g., image pull time, image file size, image upgrade time, image download time, etc.) and any other ZTP progress metrics indication of operation of the ZTP system.

The processor(s) apply a trained a machine learning model to classify operation of the policy driven ZTP process based on the ZTP progress metrics monitored during the deployment phase (526). For example, the trained machine learning model may be a machine learning model trained according to the process (500) as shown in FIG. 5A. The trained machine learning model may classify operation of the policy driven ZTP process as a normal or expected or as one or more classifications of anomalous operation.

If the machine learning model classifies operation of the policy driven ZTP system as normal or expected (NO branch of 528), the processor(s) continue to monitor the ZTP process metrics for anomalous operation (522, 524, 526). In some examples, if the machine learning model classifies operation of the policy driven ZTP system as anomalous (YES branch of 528), the processor(s) may further determine one or more root causes of the anomalous operation (530). In some examples, to determine a root cause of the anomalous operation (530), the processor(s) may refer to root cause association data stored in database, such as root cause association data 60 stored in database(s) 50 as shown in FIG. 3. Root cause association data 60 may include, for example, one or more database structures that associate classification(s) of anomalous operation of with one or more potential root causes. In other examples, to determine a root cause of anomalous operation (530), the processor(s) may invoke or request a remote or cloud-based virtual network assistant (VNA) to invoke a more complex and/or computationally expensive root cause analysis.

The processor(s) may further determine one or more remedial actions to address the root cause(s) of the anomalous operation (532). In some examples, to determine a remedial action to address a root cause of the anomalous operation (532), the processor(s) may refer to root cause association data stored in database, such as root cause association data 60 stored in database(s) 50 as shown in FIG. 3. Root cause association data 60 may include, for example, one or more database structures that associate classification(s) of anomalous operation of with one or more potential root causes, and further that associate each root cause with one or more remedial actions that may be invoked to address the respective root cause. In other examples, to determine remedial action to address a root cause of anomalous operation (532), the processor(s) may invoke or request a remote or cloud-based virtual network assistant (VNA) to invoke a more complex and/or computationally expensive root cause/remedial action analysis.

The processor(s) may further generate a notification including one or more of the ZTP process metrics monitored during the deployment phase, the anomalous operation classification, one or more root causes of the anomalous operation of the ZTP system, and one or more remedial actions to address the root cause(s) of the anomalous operation (534). In some examples, the processor(s) may further automatically invoke one or more of the determined remedial actions in an attempt to address the determined root causes of the anomalous operation of the ZTP system (534).

Further example details of root cause analysis and automatic correction techniques performed by NMS 136 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated herein by reference in their entirety.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network system, comprising:
a plurality of network devices;
memory storing a plurality of provisioning policies having a priority order; and
a system comprising one or more processors configured to:
receive a request from a first network device of the plurality of network devices, the request including network device identification information that identifies the first network device;
identify, based on the network device identification information contained in the request, a matching provisioning policy from among the plurality of provisioning policies, the matching provisioning policy having a highest priority out of one or more matching provisioning policies, wherein the network device identification information includes one or more of a Media Access Control (MAC) address for the first network device, a serial number of the first network device, a subnet of the first network device, a vendor of the first network device, and a model of the first network device; and
generate a response to the first network device, the response including address information assigned to the first network device and boot information corresponding to the first network device as defined by the matching provisioning policy.

2. The network system of claim 1, wherein the one or more processors are further configured to:
automatically generate, based on a configuration pull request received from the first network device, a boot configuration for the first network device; and
transmit the automatically generated boot configuration to the first network device.

3. The network system of claim 1, wherein the one or more processors are further configured to:
automatically retrieve, based on an image pull request received from the first network device, a boot image for the first network device; and transmit the automatically retrieved boot image to the first network device.

4. The network system of claim 1, wherein the boot information included in the response includes at least one of boot configuration information and boot image information.

5. The network system of claim 4, wherein the boot configuration information includes a uniform resource locator (URL) including a device identification token corresponding to the first network device.

6. The network system of claim 4 wherein the boot image information includes a uniform resource locator (URL) including a device identification token corresponding to the first network device.

7. The network system of claim 1, wherein the one or more processors are further configured to:
monitor one or more metrics during operation of the system during a training phase; and
train a machine learning model to classify operation of the system as one of normal operation of the system or anomalous operation of the system based on the metrics monitored during the training phase.

8. The network system of claim 1, wherein the one or more processors are further configured to:
monitor one or more metrics during operation of the system; and
classify, based on a trained machine learning model, operation of the system as one of normal operation of the system or as anomalous operation of the system based on the one or more metrics monitored during operation.

9. The network system of claim 8, wherein the one or more processors are further configured to:
in response to classifying operation of the system as anomalous operation of the system, automatically perform at least one of:
generate a notification indicative of the anomalous operation classification and at least one remedial action to address the anomalous operation of the system, or
invoke the at least one remedial action.

10. The network system of claim 1, wherein the request received from the first network device is a Dynamic Host Configuration Protocol (DHCP) request and wherein the response generated by the system is a DHCP response.

11. The system of claim 1, wherein the first network device is a physical network device.

12. A method comprising:
receiving, by one or more processors of a system, a request from a first network device of a plurality of network devices, the request including network device identification information that identifies the first network device;
identifying, by the one or more processors, a matching provisioning policy from among a plurality of provisioning policies, the plurality of provisioning policies having a priority order, based on the network device identification information contained in the request, wherein the matching provisioning policy has a highest priority out of one or more matching provisioning policies, and wherein the network device identification information includes one or more of a Media Access Control (MAC) address for the first network device, a serial number of the first network device, a subnet of the first network device, a vendor of the first network device, and a model of the first network device; and
generating, by the one or more processors, a response to the first network device, the response including address information assigned to the first network device and boot information corresponding to the first network device as defined by the matching provisioning policy.

13. The method of claim 12, further comprising:
automatically generating, based on a configuration pull request received from the first network device, a boot configuration for the first network device; and
transmitting the automatically generated boot configuration to the first network device.

14. The method of claim 12, further comprising:
automatically retrieving, based on an image pull request received from the first network device, a boot image for the first network device; and
transmitting the automatically retrieved boot image to the first network device.

15. The method of claim 12, further comprising:
monitoring one or more metrics during operation of the system; and
classifying, based on a trained machine learning model, operation of the system as one of normal operation of the system or as anomalous operation of the system based on the metrics monitored during the training phase.

16. The method of claim 15, further comprising at least one of:
generating a notification indicative of the anomalous operation classification and at least one remedial action to address the anomalous operation of the system; and
automatically invoking the at least one remedial action to address the anomalous operation of the system based on the one or more metrics monitored during operation.

17. The method of claim 12, wherein the first network device is a physical network device.

18. A network device comprising:
memory; and
one or more processors configured to:
generate a request to a system, the request including network device identification information that identifies the network device from among a plurality of network devices, wherein the network device identification information includes one or more of a Media Access Control (MAC) address for the network device, a serial number of the network device, a subnet of the network device, a vendor of the network device, and a model of the network device;
receive a response from the system, the response including address information assigned to the network device and boot information for the network device, the response generated by the system based on a matching provisioning policy identified by the provisioning system based on the network device identification information included in the request, the matching provisioning policy having a highest priority out of one or more matching provisioning policies from a plurality of provisioning policies having a priority order;
automatically generate, based on the boot information included in the response, at least one of a configuration pull request to the system and an image pull request to the system; and
automatically perform a bootstrapping operation of the network device based on at least one of a boot configuration received in response to the configuration pull request and a boot image received in response to the image pull request.

19. The network device of claim 18, wherein the boot image information includes at least one of a first URL including a device identification token corresponding to the network device, and a second URL include a device identification token corresponding to the network device.

20. The network device of claim 18, wherein the network device is a physical network device.

* * * * *